(12) United States Patent
Ueno et al.

(10) Patent No.: US 6,739,996 B2
(45) Date of Patent: May 25, 2004

(54) ENDLESS TENSION BELT AND A METHOD FOR FABRICATING THE SAME, AND A RESILIENT ENDLESS BELT TRAVELING APPARATUS

(75) Inventors: Yoshio Ueno, Kishiwada (JP); Tomohisa Yoshida, Kishiwada (JP); Takahiro Kataoka, Izumi-Ohtsu (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/891,239

(22) Filed: Jun. 27, 2001

(65) Prior Publication Data

US 2003/0008744 A1 Jan. 9, 2003

(51) Int. Cl.⁷ .............................. F16G 1/06; B29D 29/00
(52) U.S. Cl. ...................... 474/246; 156/137; 474/260
(58) Field of Search ................................ 474/237, 236, 474/246, 247, 259, 260, 261, 263, 268, 271, 254, 238; 156/137–139, 140, 157

(56) References Cited

U.S. PATENT DOCUMENTS

| 3,582,154 | A | * | 6/1971 | Russ, Sr. ..................... 305/166 |
| 4,123,946 | A | * | 11/1978 | Hollaway, Jr. ............... 156/137 |
| 4,253,836 | A | * | 3/1981 | Miranti, Jr. .................. 156/137 |
| 4,395,298 | A | | 7/1983 | Wetzel et al. ................ 156/137 |
| 4,448,621 | A | * | 5/1984 | Marsh et al. ................. 156/138 |
| 5,176,583 | A | | 1/1993 | Schanin et al. ............. 474/166 |
| 5,379,818 | A | * | 1/1995 | Suzuki et al. ................ 152/531 |
| 5,498,214 | A | * | 3/1996 | Macchiarulo et al. ....... 474/268 |
| 6,089,293 | A | | 7/2000 | Niderost ...................... 152/927 |

FOREIGN PATENT DOCUMENTS

| EP | 0 537 780 | | 4/1993 | |
| JP | 58-126134 A | * | 7/1983 | .................. 156/92 |
| JP | 08-103969 | | 4/1996 | |
| JP | 09-290468 A | * | 11/1997 | .......... B29D/30/58 |
| JP | 2000-38173 | | 2/2000 | |
| JP | 2000-344318 A | * | 12/2000 | ............. F16G/3/10 |

* cited by examiner

Primary Examiner—Marcus Charles
(74) Attorney, Agent, or Firm—Nixon Peabody LLP; David S. Safran (57) ABSTRACT

An endless tension belt is formed by spirally winding a tension member comprising a cord that serves as a core coated with a rubber-like resilient material in such a manner that flat clamp faces of adjacent tension members are pressedly joined with respect to each other.

4 Claims, 6 Drawing Sheets

ENDLESS TENSION BELT AND A METHOD FOR FABRICATING THE SAME, AND A RESILIENT ENDLESS BELT TRAVELING APPARATUS

BACKGROUND OF THE INVENTION

1. Field of the Invention

The present invention relates to an endless tension belt and a method for fabricating the same, and a resilient endless belt traveling apparatus, which is used for crawler traveling apparatus, transmission belt, or the like.

2. Description of the Related Art

In the resilient endless traveling belt (crawler), the transmission belt or the like to be used in a crawler traveling apparatus for high-speed snow vehicle such as recreational vehicles, construction and civil engineering vehicles, or farm working vehicles, a tension cord is embedded to support the tensile strength acting along the length thereof.

In order to obtain the circumferentially uniform strength characteristics of the tensile strength to avoid difference in rigidity, a technology in which the continuity of reinforcement strength is established by winding and juxtaposing the cord in a spiral fashion is proposed in Japanese Unexamined Patent Publication No. HEI 12-38173.

The related art disclosed in the above-described publication is "A method of fabricating spiral cords to be embedded in a crawler or the like comprising steps of setting a cord by winding the cord in a spiral fashion around an inner treated rubber layer in the shape of an endless ring, winding an outer treated rubber layer around the inner treated rubber layer and the cord, and clamping the cord layers comprising inner treated rubber layer, a cord, and outer treated rubber layer, and a fabricating apparatus therefor", or "A method of fabricating spiral cords to be embedded in the crawler or the like comprising steps of providing cord groove on the outer peripheral surface of an inner treated rubber layer in the shape of an endless ring at prescribed pitches, setting the cord in the cord groove in a spiral fashion, winding an outer treated rubber layer around the outer periphery of the inner treated rubber layer and the cord, and clamping the cord layers comprising the inner treated rubber layer, a cord, and outer treated rubber layer."

However, though the related art is useful in its own way, it has the following problem.

When the three layers of inner treated rubber layer, spiral cord, and outer treated rubber layer are clamped, irregularity of pitches or the like of the cord may often occur, and air encroaches between the layers and, as a consequent, air bubbles formed by the encroached air are trapped between layers, which causes separation of layers.

In addition, it requires an additional and profitless process of forming the cord groove on the inner treated rubber layer, and the cord may come off the groove when the cord is wound along the cord groove, or irregularity of cord may often be occurred due to flowage of rubber since it is three-layer clamped structure.

SUMMARY OF THE INVENTION

Accordingly, it is the first object of the present invention to provide an endless tension belt in which a tension cord is orderly arranged without irregularity, and of good quality.

It is the second object of the present invention to provide a method for fabricating high quality endless tension belt in a simple manner.

It is the third object of the present invention to provide a resilient endless belt traveling apparatus that includes the endless tension belt embedded along the length of the resilient endless belt (crawler) to reliably prevent the resilient belt from being stretched, and is suitable for high-speed performance.

The present invention provides an endless tension belt comprising an elongated tension member spirally and juxtaposingly wound into a band-shape, the tension member comprising a tension cord as a core and a rubber-like resilient material for coating the cord along the length thereof, in which the following technical steps are taken in order to achieve the first object described above.

The spiral endless tension belt according to the present invention is characterized in that the tension member formed of rubber-like resilient material has two opposed surfaces, which are formed into flat clamp faces so that the adjacent clamp faces are clamped with each other when the tension member is juxtaposingly wound in a spiral fashion to make it into a band-shape.

In this arrangement, when the elongated tension member is supplied to a winding drum to be wound in a spiral fashion, a tension member supplying position is traversed relative to the drum in the direction of the axis of the drum. Therefore, the adjacent flat clamp faces opposed with each other are applied with a pressure in the direction of the axis of the drum, and as a consequent, these clamp faces are pressedly joined with each other, whereby no air is trapped and thus a homogeneous and high quality endless tension belt is obtained.

The rubber-like resilient material for coating the tension cord, which serves as a core, is preferably in the unvulcanized or semi-cured state.

By juxtaposingly winding the tension member formed of rubber-like resilient material in unvulcanized or semi-cured state in a spiral fashion, joining properties at the joint between the clamp faces of the adjacent tension members is improved.

In addition, preferably, the elongated tension member is formed by coating a single tension cord or a plurality of tension cords juxtaposed at intervals with the rubber-like resilient material, and the tension cord is decentered in the thicknesswise direction of the tension belt by varying the thickness of coating.

In this way, since the tension cord is decentered with respect to the thickness of the tension belt so as to obtain a thicker layer and a thinner layer of the rubber-like resilient material on each side of the cord in the thicknesswise direction of the tension belt, when the belt is embedded into a crawler, the surface of the endless tension belt to be faced with a layer on the outside or inside of the crawler can be selected in accordance with the kind and nature of the outer rubber layer (tread rubber) and the inner rubber layer (rubber in contact with rolling wheel) of the crawler.

In the present invention, preferably, the elongated tension member is juxtaposingly wound around a resilient sheet, juxtaposingly wound around and encapsulated by a canvas bag, or juxtaposingly wound around a resilient sheet and encapsulated by the sheet and the canvas.

The spiral endless tension belt here, as it will be apparent from the description below, is manufactured by winding the elongated tension member in such a manner that the adjacent clamp faces are joined with each other without being piled or separated.

As the tension cord that serves as a core, twisted several steel filaments, a steel cord formed by twisting several bundle of twisted several steel filaments, a cord constructed of filaments of nylon, tetron, or the like as well as the aramid fiber, such as KEVLAR™ (para-phenyleneterephthalamide), and so on may be employed.

The present invention provides a method of fabricating an endless tension belt in which an elongated tension member formed by coating a tension cord that serves as a core with a rubber-like resilient material is wound in a spiral fashion, and the following technological steps are taken in order to achieve the second object described above.

The method is characterized in that when the elongated tension member is supplied to the winding drum, it can be juxtaposingly wound in a spiral fashion around the drum while the flat clamp faces of the rubber-like resilient material of the adjacent tension members are pressedly joined with respect to each other.

Since the endless tension belt is fabricated only by pressedly joining the adjacent clamp faces of the tension member formed of the rubber-like resilient material with respect to each other around the drum, the process of forming the cord groove as required in the related art is not necessary, and irregularity of tension cord that serves as a core is eliminated, and thus a homogeneous and high-quality endless tension belt is provided.

In the method described above, it is preferred that the elongated tension member is wound around the drum in such ways as being juxtaposingly wound around a resilient sheet mounted around the drum, being juxtaposingly wound around and encapsulated by a canvas bag, or being juxtaposingly wound around a resilient sheet and encapsulated by the sheet and a canvas.

In this case, the belt can be manufactured in such a simple manner as supplying the resilient sheet or the canvas to the winding drum and simultaneously supplying the tension member thereon, and then pressedly joining the clamp faces of the tension member with each other. The canvas may be folded into a bag-shape after the belt is formed.

A resilient endless belt traveling apparatus according to the present invention comprises a resilient crawler to be wrapped around a driving wheel and a following wheel in an endless manner, and the following steps are taken in order to achieve the third object described above.

The apparatus is characterized in that the spiral endless tension belt is embedded in the resilient crawler along the length thereof.

Since this arrangement prevents stretch of the crawler along the length thereof by the endless tension belt, uniform rigidity in the entire length of the belt can be obtained, thereby reliably preventing breakage or separation of the cord even when the crawler is subjected to the compression and tension repeatedly during travel.

The rubber-like resilient body of the elongated tension member described above is preferably contains 45–80 weight parts of carbon black (DBP oil absorption 60–120 $cm^3/100$ g, $N_2SA$ 65–110 $m^2/g$) per 100 weight parts of polymer component chosen from the group consisting of natural rubber, homo-polymer of conjugated diolefin, co-polymer of conjugated diolefin and ethylene unsaturated monomer, and the composite thereof, and the content of cobalt is 0.03–0.3 wt % of the entire rubber component.

By containing 45–80 weight parts of carbon black, a prescribed hardness, strength and elastic modulus can be obtained for the rubber composition for coating the cord. In other words, when the content of carbon black is less than 45 weight parts, the strength is not sufficient, and in contrast, when the content of carbon black exceeds 80 weight parts, resistance to heat build-up is lowered and thus the deterioration of adherence with respect to the cord is disadvantageously promoted.

In addition, by containing 0.03–0.3 wt % of cobalt, favorable bonding can be formed between the composition and the cord. In other words, when it is below 0.03 wt %, sufficient bonding cannot be obtained, while when 0.3 wt % or more cobalt is contained, deterioration of bonding layer after it is formed is disadvantageously promoted.

BRIEF DESCRIPTION OF THE DRAWINGS

FIG. 13 is a schematic diagram showing a vulcanizing apparatus, in which

DESCRIPTION OF THE PREFERRED EMBODIMENTS

Referring now to the drawings, preferred embodiments of the present invention will be described.

FIGS. 1A, 1B, FIGS. 2A, 2B, and FIGS. 3A, 3B show the first to sixth embodiments of an elongated tension member 1, which is a material for a spiral endless tension belt according to the present invention.

The elongated tension member 1 comprises a tension cord 2 that serves as a core and a rubber-like resilient material 3 for coating the cord along the length thereof.

Figure 4:
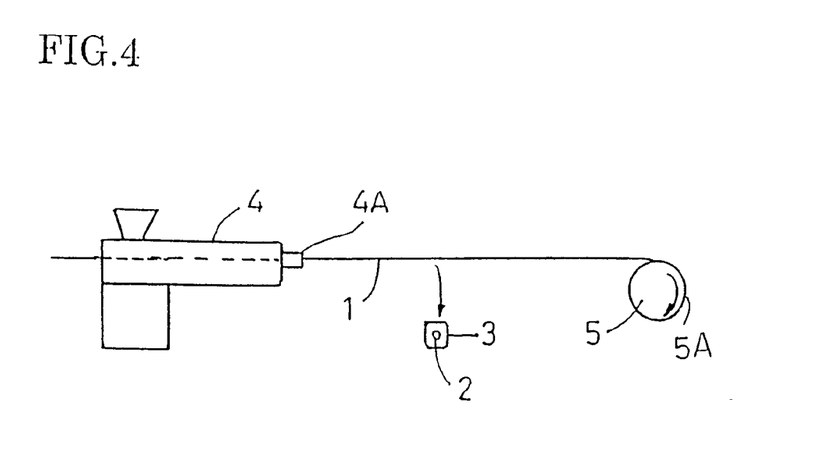
FIG. 4 is a schematic diagram showing an embodiment of a tension member forming apparatus.

For example, as shown in FIG. 4, the tension belt can be fabricated by the steps of passing the tension cord 2 through a nozzle 4A of the extruder or injection machine 4 for rubber, resin, or the like, coating the cord 2 with rubber or the like, and winding it on the drum 5 in a spiral fashion.

Figure 1A:
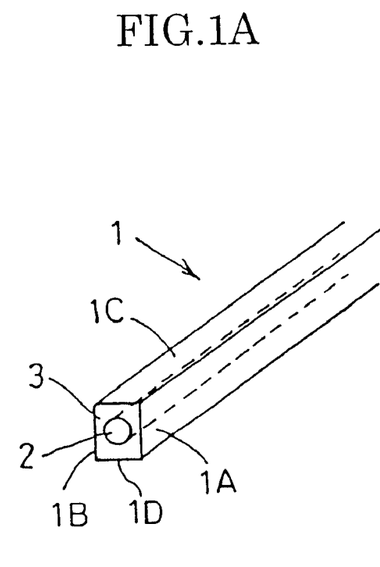
FIG. 1A is a perspective view showing a first embodiment of a tension member according to the present invention and FIG. 1B is a perspective view showing a second embodiment of the same.

FIG. 1A is a tension member comprising a single tension cord 2 having a cross section of circular or round of approximately 2–3 mm in diameter coated with the rubber-like resilient material 3 having a cross section of square of 4–6 mm on a side, and each of outer surfaces is formed into flat and the opposing two side surfaces 1A, 1B are formed as flat clamp faces.

Figure 1B:
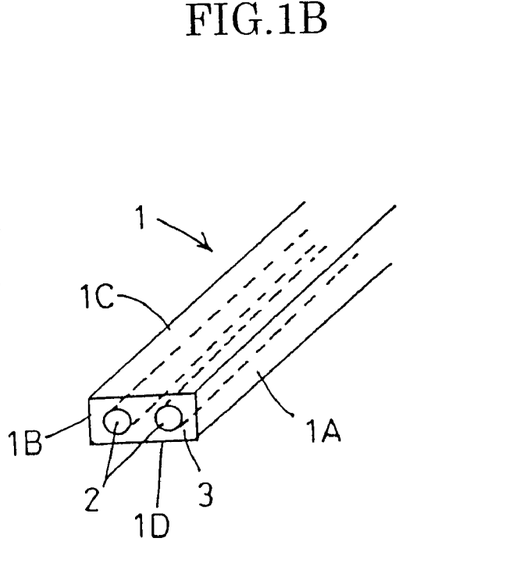

FIG. 1B shows a tension member comprising two cords 2 having a cross section of circular or round arranged in parallel and coated with a rubber-like resilient material 3 having a cross section of rectangular of 7–9 mm on upper and lower sides, and 4 mm–6 mm on left and right sides, and the opposing two side surfaces 1A, 1B are formed as flat clamp faces.

Figure 2A:
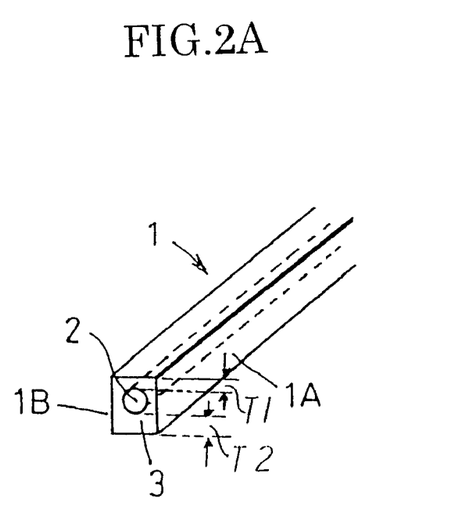
FIG. 2A is a perspective view showing a third embodiment of the tension member according to the present invention.
Figure 2B:
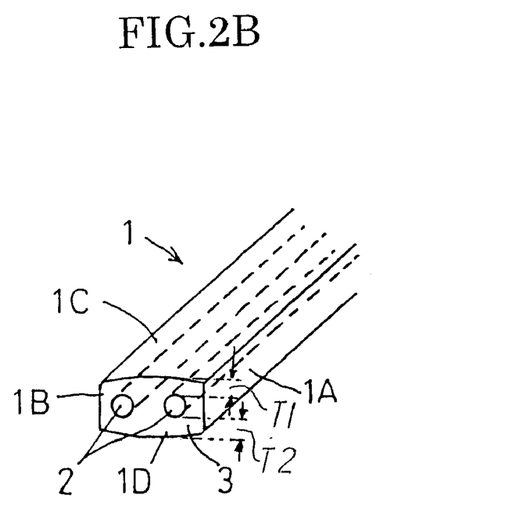
FIG. 2B is a perspective view showing a fourth embodiment of the same.

FIG. 2A shows a tension member comprising a single tension cord 2 eccentrically coated with the rubber-like resilient material 3 so that the thickness of coating T1, T2 are different in the direction of thickness, and FIG. 2B shows a tension member comprising two cords 2 coated with approximately rectangular rubber-like resilient material 3 of which the opposing two side surfaces 1A, 1B are formed as flat clamp faces, though the upper and lower surfaces 1C, 1D of the resilient material 3 are slightly incurvated.

Figure 3A:
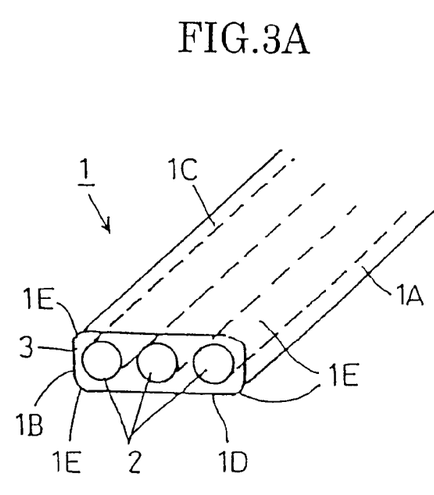
FIG. 3A is a perspective view showing a fifth embodiment of the tension member according to the present invention.
Figure 3B:
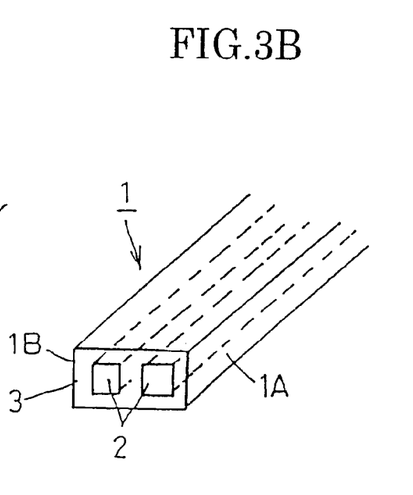
FIG. 3B is a perspective view showing a sixth embodiment of the same.

FIG. 3A shows a tension member comprising three cords 2, and FIG. 3B shows a tension member comprising two cords 2 having cross sections of a ceratoid (including square, rectangular, pentagon and hexagon), and in both cases, the opposing side surfaces 1A, 1B of the rubber-like resilient material 3 are formed as flat clamp faces.

The tension member 1 having such cross-sections is formed by coating the cord 2 with the unvulcanized or semi-cured rubber-like resilient body 3 having the same cross section as that of the nozzle 4A shown in FIG. 4, and then winding it around the drum 5 to be formed into a coil 5A.

Specifically, the composition of the rubber-like resilient material 3 contains 45–80 weight part of carbon black (DBP oil absorption 60–120 cm$^3$/100 g, $N_2$ SA 65–110 m$^2$/g) per 100 weight parts of polymer component chosen from the group consisting of natural rubber, homo-polymer of conjugated diolefin, co-polymer of conjugated diolefin and ethylene unsaturated monomer, and the composite thereof, and the content of cobalt is 0.03–0.3 wt % in the entire rubber component.

By containing 45–80 weight parts of carbon black, a prescribed hardness, strength and elastic modulus can be obtained for the cord-coating rubber composition for coating the cord (rubber-like resilient material 3 ). In other words, when the content of carbon black is less than 45 weight parts, the strength is not sufficient, and in contrast, when the content of carbon black exceeds 80 weight parts, heat build-up resistance is lowered and thus the deterioration of adherence with respect to the cord is disadvantageously promoted.

By containing 0.03–0.3 wt % of cobalt, preferable bonding can be formed between the composition and the cord. In other words, when it is below 0.03 wt %, sufficient bonding cannot be obtained, and when 0.3 wt % or more cobalt is contained, deterioration of bonding layer after it is formed is disadvantageously promoted.

Here, the prescribed hardness Hs is 55–85 in Japanese Industrial Standards (JIS). When the value is below 55, the rigidity is insufficient, and when the value is 85 or more, the stress is disadvantageously concentrated. The prescribed strength (MPa) is 12.0 MPa or more. When the value is below 12.0 MPa, rubber destruction and debonding are apt to occur when it is subjected to a large distortion. In addition, a prescribed elastic modulus (tan δ) is 0.5 or below at 25° C. It is because the value over 0.5 will be disadvantageous in the heat build-up resistance.

TABLE 1

|  | Reference Example 1 | Reference Example 2 | Reference Example 3 | Reference Example 4 | Example 1 | Example 2 | Example 3 |
| --- | --- | --- | --- | --- | --- | --- | --- |
| Natural rubber (PHR) | 100 | 100 | 100 | 100 | 100 | 100 | 100 |
| Carbon (PHR) | 60 | 90 | 30 | 60 | 70 | 60 | 50 |
| Content of Cobalt (%) | 0.01 | 0.1 | 0.1 | 0.5 | 0.1 | 0.1 | 0.1 |
| IB(MPa) | 23.3 | 28.3 | 11.3 | 23.9 | 24.9 | 23.4 | 21.8 |
| Hs(JIS) | 71 | 86 | 56 | 72 | 75 | 72 | 68 |
| Tanδ 25° C. | 0.185 | 0.366 | 0.105 | 0.177 | 0.221 | 0.180 | 0.167 |
| Wet heat deterioration resistance (Index) | 100 | 99 | 100 | 75 | 98 | 99 | 98 |
| Adhesive properties with respect to steel cord (Index) | 100 | 135 | 135 | 145 | 130 | 135 | 140 |
| Rubber internal destruction resistance (Index) | ○ | ○ | X | ○ | ○ | ○ | ○ |
| Rubber surface destruction resistance (Index) | ○ | X | ○ | ○ | ○ | ○ | ○ |

Any one of the configuration or the number of the cord 2 shown in the embodiments may be selected, and the contour of the cross section of the tension member 1, or practically, the rubber-like resilient body 3 may be varied as far as at least the both side surfaces 1A, 1B are formed into flat clamp faces. For example, the corner portion may be chamfered or radiused as shown by 1E in FIG. 3A.

Here, the tension cord 2 may be formed of a steel cord, nylon cord, Kevlar cord or the like formed by various filaments twisted or arranged in parallel, and the composition of rubber-like resilient material 3 may contain cobalt or the like mixed therein.

Table 1 shows Examples 1 to 3 of the resilient material 3 and Reference Examples 1 to 4 are shown for comparison therebetween. In Table 1, "O" means superior, "X" means inferior.

As is apparent from Table 1, the compositions according to the present invention are superior in rubber internal destruction resistance and in rubber surface destruction resistance.

Figure 5:
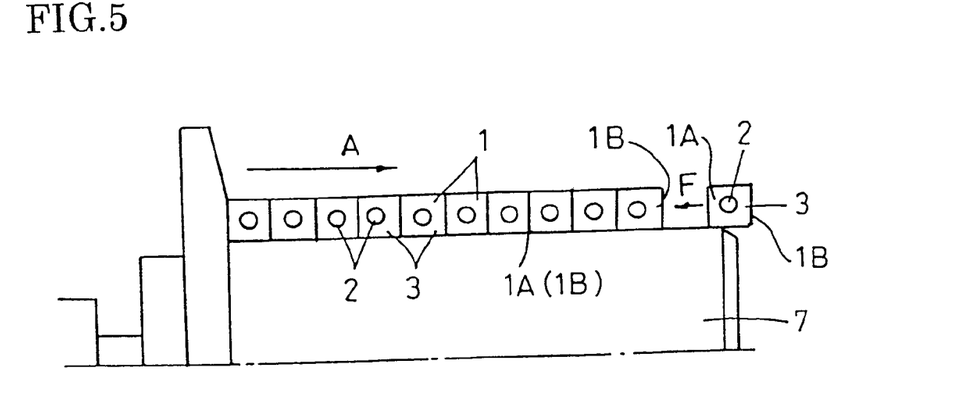
FIG. 5 is a side view showing an example of a method of fabricating a first embodiment of an endless tension belt.
Figure 6:
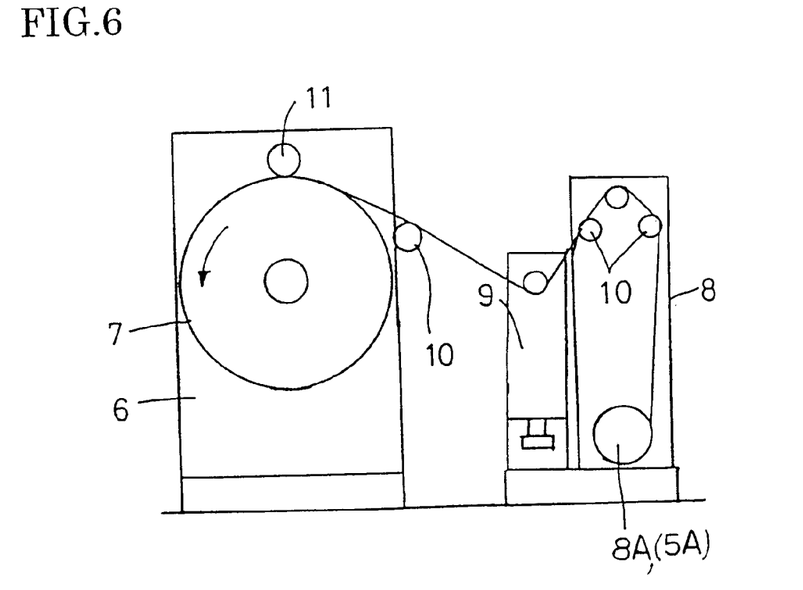
FIG. 6 is a front view showing an embodiment of an apparatus for fabricating the endless tension belt.

In FIG. 5 and FIG. 6, there is shown a method of fabricating a first embodiment of an endless tension belt 5 of wrap-around type (spiral winding) using the tension member 1 formed into a coil 5A as described above.

In FIG. 6, the winding unit 6 is provided with a cylindrical winding drum 7, a supplying unit 8 is disposed facing off against the winding unit 6, and a traverser 9 capable of reciprocating motion in the direction of the axis of the drum is provided between these machines 6 and 8.

In other words, the coiled tension member 5A is mounted on the supplying reel (unwinding reel) 8A to be unwound, and supplied to the drum 7 that is rotating in the winding direction via a group of guide rollers 10 and the traverser 9.

As shown in FIG. 5, when the elongated tension member 1 is juxtaposingly wound in a spiral fashion from the proximal end of the drum 7 toward the free end of the drum, it is juxtaposingly wound as shown by the arrow A so that a pressure F is applied to the opposing two surfaces of the adjacent tension member 1, or on the flat clamp faces 1A, 1B, with respect to each other in the direction of the axis of the drum.

Figure 10:
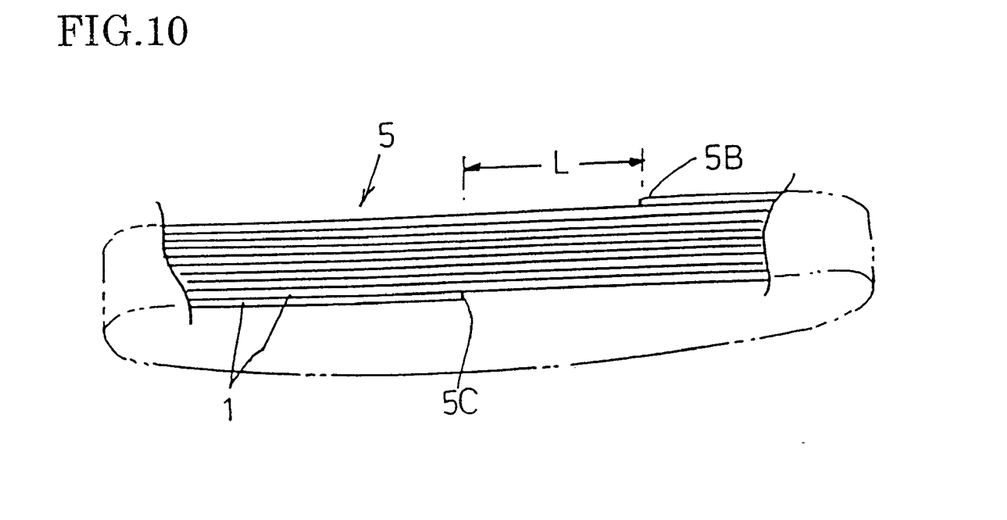
FIG. 10 is a perspective view of the endless tension belt.

More specifically, by moving the traverser 9 after every rotation of the drum 7 for example, the clamp faces 1A, 1B are pressedly joined with respect to each other so that the tension member 1 is formed into an endless tension belt 5 as shown in FIG. 10 (FIG. 10 shows the endless tension belt which is released from the drum 7 and appears to be flat.).

When the tension member 1 is wound around the drum 7 in a spiral fashion, the tension member 1 is preferably pressed by a pressing roller 11 shown in FIG. 6 in the radially inward direction. Though the roller 11 may be elongated in the direction of the axis of the drum, it is preferable to make it traverse in the direction of the axis of the drum when pressing the individual tension member 1.

In addition, the drum 7 may be applied with releasing agent or the like therearound so that the endless tension belt 5 juxtaposingly wound on the drum 7 can advantageously be released smoothly and quickly without deformation.

The pressure F required for joining the adjacent tension members 1 being juxtaposingly wound may be obtained by the traversing action of the traverser 9. Alternatively, the pressure may be supplied to the tension member 1 diagonally with respect to the axial direction of the drum 7 via a guide (preferably being capable of traverse motion) attached to the drum 7, not shown.

In addition, as shown in FIG. 10, it is advantageous to provide a distance L between the beginning end 5B and the terminating end 5C of the tension member 1 in the longitudinal direction thereof for eliminating the difference of rigidity generated when the tension belt 5 is embedded in a crawler and vulcanized, and thus the debonding of end portions can be prevented.

Figure 7:
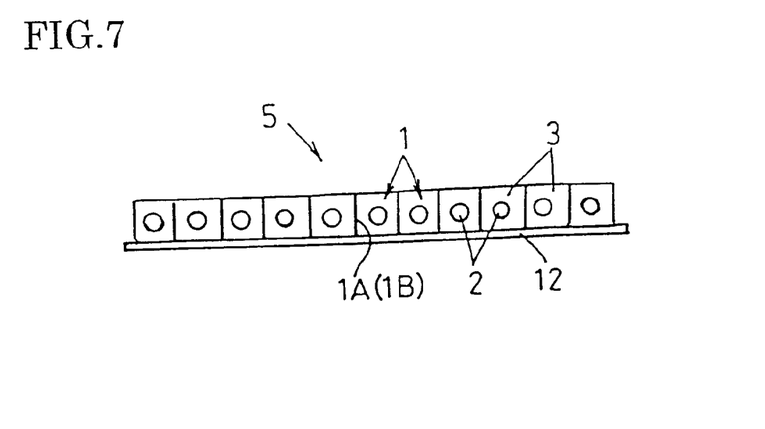
FIG. 7 is a front view showing a second embodiment of the endless tension belt.
Figure 8:
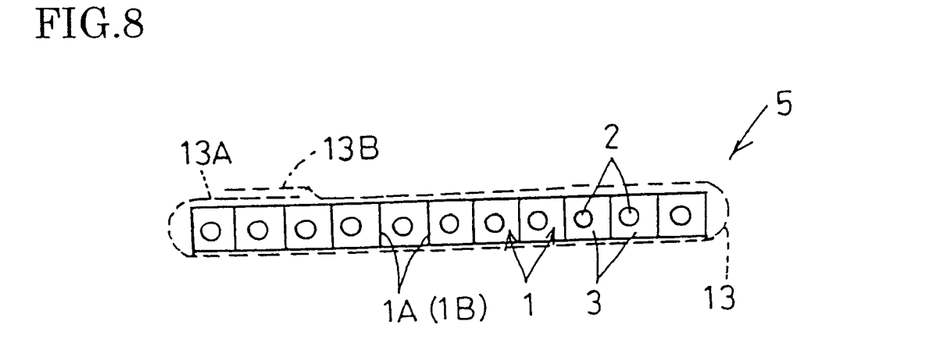
FIG. 8 is a front view showing a third embodiment of the endless tension belt.
Figure 9:
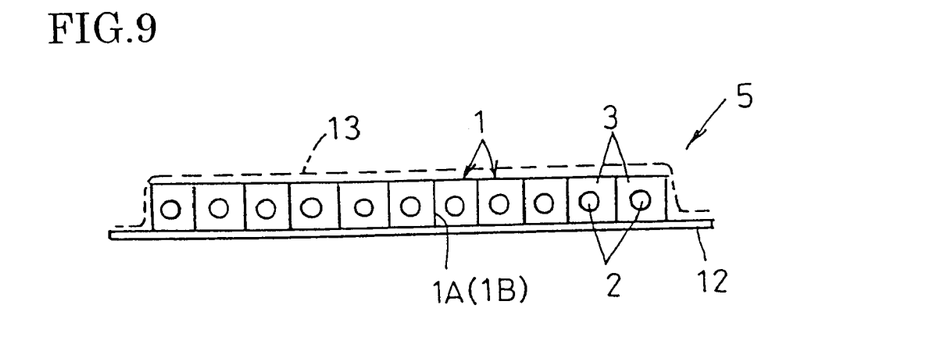
FIG. 9 is a front view showing a fourth embodiment of the endless tension belt.

FIG. 7 to FIG. 9 show various embodiments (second to fourth embodiments) of the endless tension belt 5 formed by the drum 7 described above.

FIG. 7 shows an endless tension belt 5 formed by pressedly joining a tension member 1 around a resilient (rubber) sheet 12, more specifically, formed by mounting the sheet 12 around the drum 7, juxtaposingly winding the tension member 1 around the sheet 12 in a spiral fashion as described above, and pressedly joining the clamp faces 1A, 1B with respect to each other to form the tension member 1 into a band shape.

FIG. 8 shows an endless tension belt 5 fabricated by the steps of juxtaposingly winding an elongated tension member 1 around a cloth (a textile) or a canvas 13 mounted around the drum 7 in a spiral fashion, pressedly joining the clamp faces 1A, 1B with respect to each other to form the tension member 1 into a band shape, and covering the tension member 1 (band-shaped body) with the canvas 13.

In FIG. 8, the endless tension belt 5 is formed by mounting the canvas 13 having a width greater than that of the tension belt 5 around the drum 7, juxtaposingly winding the tension member 1 around the canvas 13 in a spiral fashion, pressedly joining the clamp faces 1A, 1B with respect to each other to form the tension member 1 into a band-shape, folding the left and right edges 13A, 13B of the canvas 13 so as to wrap the band shaped tension member 1, overlapping the edges 13A, 13B with respect to each other, and joining them together.

The tension belt 5 shown in FIG. 9 is formed by the steps of juxtaposingly winding the tension member 1 around the resilient sheet 12 in a spiral fashion, pressedly joining the clamp faces 1A, 1B so as to form the tension member into a band shape, and mounting the canvas 13 around the band-shaped tension member 1 to wrap the band-shaped tension member 1 between the resilient sheet 12 and the canvas 13.

Though the endless tension belts 5 shown in FIG. 7 to FIG. 9 are fabricated with the elongated tension member 1 shown in FIG. 1A as a material, it is also possible to use an elongated tension member 1 shown in FIG. 1B, FIGS. 2A, and 2B, and FIGS. 3A and 3B.

Figure 11:
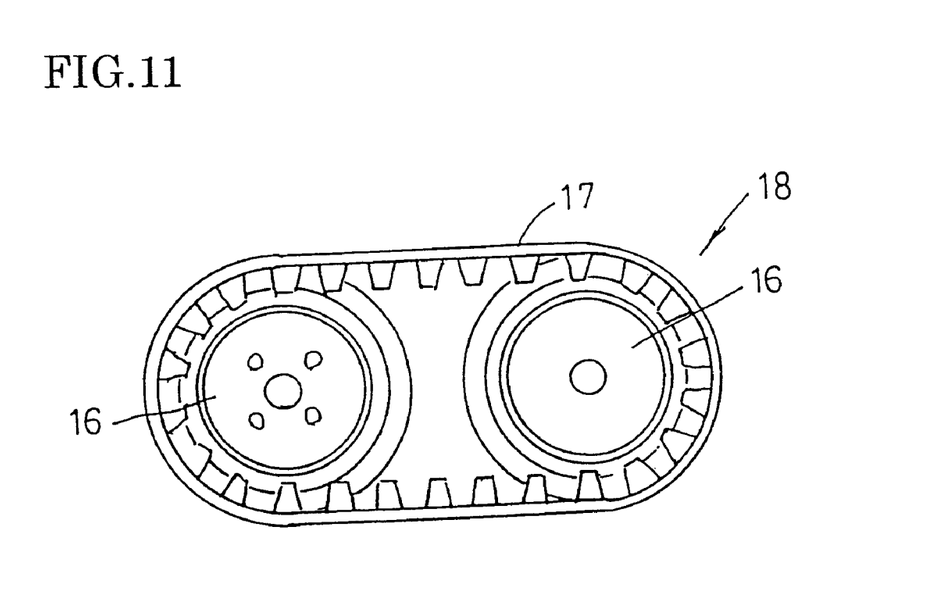
FIG. 11 is a side view showing an embodiment of a crawler traveling apparatus.
Figure 12:
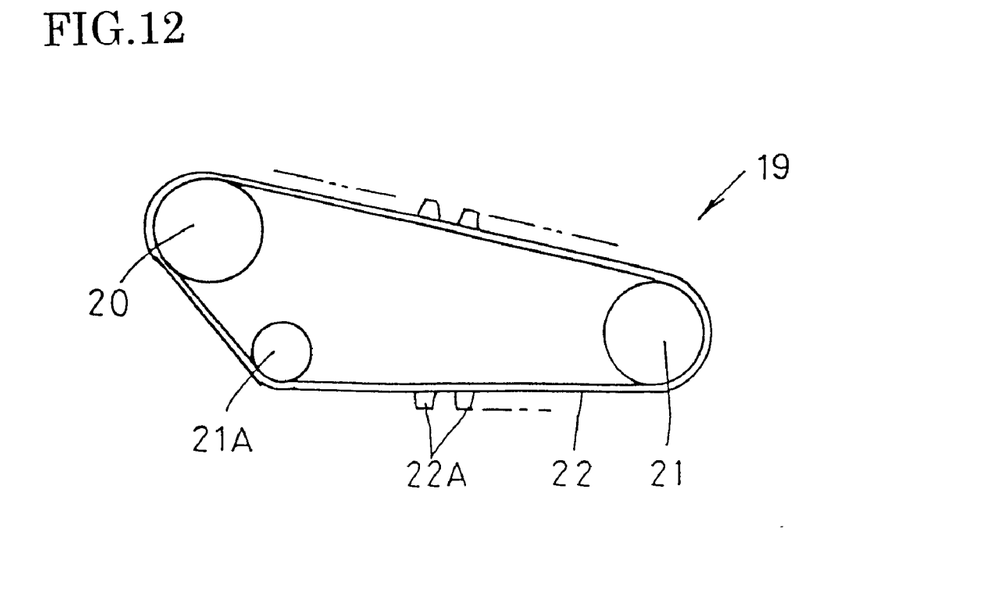
FIG. 12 is a side view showing another embodiment of the crawler traveling apparatus.

FIG. 11 and FIG. 12 show a crawler traveling apparatus using an endless traveling belt in which the endless tension belt 5 described above is embedded.

In the apparatus, an endless resilient belt, or a crawler, is wrapped around a pair of wheels at least one of which is driven so as to travel the crawler, and any one of the endless tension belt shown in the first to fourth embodiments described above are embedded in the resilient belt along the length thereof.

FIG. 11 shows a crawler traveling apparatus 18 comprising an endless resilient belt 17 wrapped around two tires (pneumatic tires) 16 facing with each other so as to be traveled by driving the tire 16, in which the endless tension belt 5 is embedded preferably on a neutral surface side of the resilient belt 17 (surface on which neither compression (acts on the inner surface) nor tension (acts on the outer surface) is applied when the resilient belt contacts the wheels).

FIG. 12 is a crawler traveling apparatus 19 for agricultural machineries or construction equipment comprising an endless resilient belt 22 having lugs 22A wrapped around a driving wheel, or a sprocket wheel, 20 and a following wheel 21 via an idler wheel 21A, in which the endless tension belt 5 described above is embedded in the resilient belt 22.

The endless resilient belt may be provided with core metals (traversal reinforcing member) disposed in parallel at intervals longitudinally of the crawler belt 22, and in this case, the endless tension belt is embedded on the outer side of the core metals in the thicknesswise direction of the resilient belt.

As a matter of course, the endless resilient belt may be used as a crawler for high-speed driving vehicles such as snow vehicles (rubber crawler without core metal), and also as a transmission belt.

In the crawler traveling apparatuses, a single or a plurality of endless tension belt(s) 5 may be embedded at the left and right wing portions of the crawler track in the widthwise direction of the crawler track 22.

Figure 13A:
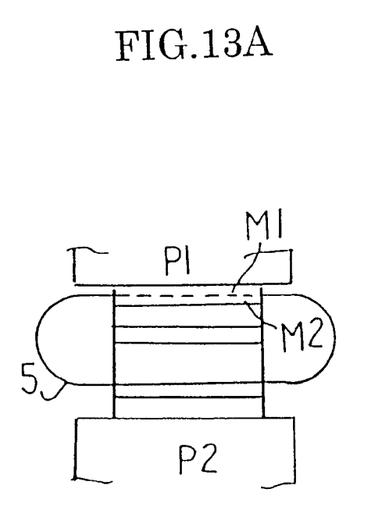
FIG. 13A is a front view.
Figure 13B:
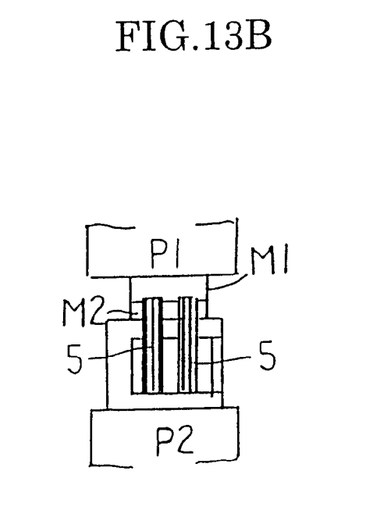
FIG. 13B is a side view.

FIGS. 13A and 13B show the endless tension belt 5 under a vulcanization process.

The endless tension belt 5 passes between the upper and lower molds M1, M2 between the upper and lower presses P1 and P2 to be vulcanized all over the length.

Figure 14:
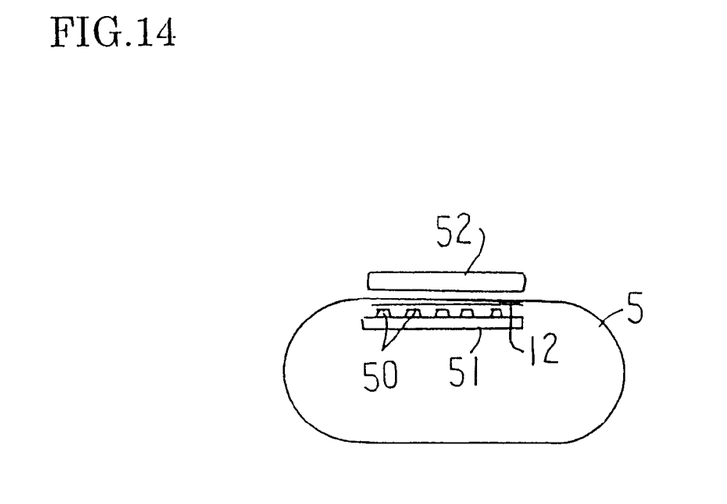
FIG. 14 is a schematic diagram showing a method of manufacturing a rubber crawler having a core metal.

FIG. 14 shows an example of press molding of a rubber crawler comprising steps of placing the core metals 50 on the base rubber layer (inner rubber layer) 51, placing a rubber sheet 12 thereon, and passing the vulcanized endless tension belt 5 between the rubber sheet 12 and a tread rubber layer (outer rubber layer) 52.

Though FIG. 14 shows a partial press molding, which is performed all over the length (whole circumference), other press molding may be employed as a matter of course. The rubber layers 51, 52 are set in partial molds.

Preferred embodiments described thus far are for illustrative purpose only, and not restrictive. The scope of the invention is defined only by the appended claims, and all changes that fall within meets and bounds of the claims are intended to embraced by the claims.

What is claimed is:

1. A method of fabricating an endless tension belt formed by winding an elongated tension member in a spiral fashion comprising the steps of:

coating a tension cord that serves as a core with a resilient material longitudinally along the cord to form said elongated tension member having longitudinal flat clamp faces by extruding said tension cord and said resilient material through at least one of an extruder and an injection machine;

supplying said tension member to a winding drum with the resilient material in an unvulcanized or semi-cured state; and juxtaposingly winding said tension member around said drum while only laterally press joining adjacent flat clamp faces of the windings of said tension member formed of the resilient material with a traverser to form an endless tension member, wherein the lateral pressure is applied only orthogonally by the traverser to the adjacent flat clamp faces of the wound tension member; and vulcanizing the endless tension member resulting from said juxtaposing step in a mold to produce a finished endless tension belt.

2. A method of fabricating an endless tension belt as set forth in claim 1, wherein said extruded resilient material is unvulcanized or semi-cured.

3. A method of fabricating an endless tension belt as set forth in claim 1, wherein the extrusion coated tension cord comprises a tension cord formed of a tension single cord or a plurality of tension cords arranged in parallel at intervals within the resilient material.

4. A method of fabricating an endless tension belt as set forth in claim 1, wherein the thickness of the extruded resilient material varies in the direction of the thickness so that the tension cord is decentered with respect to the resilient material.

* * * * *